(12) United States Patent
Sun et al.

(10) Patent No.: US 12,267,131 B2
(45) Date of Patent: Apr. 1, 2025

(54) RADIO (NR) MULTI-INPUT MULTI-OUTPUT (MIMO) CHANNEL STATE INFORMATION (CSI) DESIGN FOR SMALL BANDWIDTH PART (BWP)

(71) Applicants: Apple Inc., Cupertino, CA (US); Haitong Sun, Cupertino, CA (US)

(72) Inventors: Haitong Sun, Cupertino, CA (US); David Neumann, Munich (DE); Dawei Zhang, Saratoga, CA (US); Ghaith N. Hattab, Santa Clara, CA (US); Ismael Gutierrez Gonzalez, San Jose, CA (US); Wei Zeng, Saratoga, CA (US); Yeong-Sun Hwang, Germering (DE); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/439,292

(22) PCT Filed: Apr. 8, 2020

(86) PCT No.: PCT/CN2020/083800
§ 371 (c)(1),
(2) Date: Sep. 14, 2021

(87) PCT Pub. No.: WO2021/203312
PCT Pub. Date: Oct. 14, 2021

(65) Prior Publication Data
US 2023/0042538 A1 Feb. 9, 2023

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0639* (2013.01); *H04L 5/0057* (2013.01); *H04L 5/0094* (2013.01); *H04W 72/044* (2013.01)

(58) Field of Classification Search
CPC .. H04B 7/0626; H04B 7/0639; H04B 7/0469; H04B 7/0456; H04B 7/063;
(Continued)

(56) References Cited

U.S. PATENT DOCUMENTS 10,111,224 B2   10/2018   Lee et al.
2019/0109626 A1  4/2019   Park et al.
(Continued)

FOREIGN PATENT DOCUMENTS

CN   110535513 A   12/2019
CN   110945799 A    3/2020
(Continued)

OTHER PUBLICATIONS

R1-2003880, May 25, 2020, 3GPP.*
(Continued)

*Primary Examiner* — Abdullahi E Salad
(74) *Attorney, Agent, or Firm* — Sterne, Kessler, Goldstein & Fox P.L.L.C.

(57) ABSTRACT

Some aspects of this disclosure relate to apparatuses and methods for implementing capability signaling design for 3rd Generation Partnership Project (3GPP) release 15 (Rel-15) and/or release 16 (Rel-16) multi-input multi-output (MIMO) enhancement. For example, systems and methods are provided implementing designs for New Radio (NR) MIMO channel state information (CSI) for a small bandwidth part (BWP) and/or a small number of subbands. For example, some aspects relate to a user equipment (UE) including a transceiver configured to communicate with a base station and a processor communicatively coupled to the
(Continued)

transceiver. The processor receives, from the base station, a CSI reporting configuration message. The processor determines, using the CSI reporting configuration message, that a number of physical resource blocks (PRBs) of a BWP associated with the CSI reporting configuration message is less than a threshold number. The processor also generates and transmits a CSI report for the BWP.

18 Claims, 7 Drawing Sheets

(51) Int. Cl.
*H04W 72/04* (2023.01)
*H04W 72/044* (2023.01)

(58) Field of Classification Search
CPC ... H04B 7/0632; H04L 5/0057; H04L 5/0094; H04L 5/0092; H04L 5/0005; H04W 72/044; H04W 24/10; H04W 72/0453; H04W 72/21
See application file for complete search history.

(56) References Cited

U.S. PATENT DOCUMENTS

| | | | |
|---|---|---|---|
| 2021/0258058 A1 | 8/2021 | Wu et al. | |
| 2021/0297134 A1* | 9/2021 | Rahman | H04B 7/0632 |
| 2021/0336665 A1* | 10/2021 | Jin | H04B 7/0634 |
| 2022/0109480 A1* | 4/2022 | Hao | H04L 5/0057 |

FOREIGN PATENT DOCUMENTS

| | | |
|---|---|---|
| EP | 3537813 A1 | 9/2019 |
| JP | 2014531856 A | 11/2014 |
| WO | WO 2018097582 A1 | 5/2018 |
| WO | WO 2020060346 A1 | 3/2020 |
| WO | WO 2020173402 A1 | 9/2020 |

OTHER PUBLICATIONS

International Search Report and Written Opinion directed to related International Application No. PCT/CN2020/083800, mailed on Dec. 30, 2020, 8 pages.
OPPO, "Remaining Issues and Text Proposals for Beam Management," 3GPP TSG RAN WGI Meeting #93, R1-1806840, May 25, 2018 (May 25, 2018), 8 pages.
Samsung, "Feature lead summary for [100e-NR-eMIMO-MUCSI-01]," 3GPP TSG RAN WG1#100_e R1-2001215, 3GPP, Feb. 29, 2020.
Nokia, Nokia Shanghai Bell, "Rel-16 Type II related UE capabilities and remaining UCI aspects," 3GPP TSG RAN WG1#99 R1-1912718, 3GPP, Nov. 8, 2019.
Huawei, HiSilicon, "Remaining issues on MU-CSI in R16," 3GPP TSG RAN W G1#100_e R1-2000205, 3GPP, Feb. 15, 2020.
Huawei, HiSilicon, "Introducing MAC CEs for NR MIMO," 3GPP TSG RAN WG2 #101 R2-1801948, 3GPP, Feb. 15, 2018.
Extended European Search Report directed to related European Application No. 20930572.1, mailed Jan. 4, 2024; 11 pages.
3GPP, 3GPP TS 38.214 V16.1.0, NR; Physical layer procedures for data (3GPP server publication date: Apr. 1, 2020); 151 pages.
Notice of Preliminary Rejection directed to Korean Application No. 10-2022-7037226, with English-language translation attached, mailed Oct. 14, 2024; 7 pages.
Office Action and Search Report directed to Chinese Application No. 202080099476.9, with machine translation attached, mailed Jan. 24, 2024; 16 pages.

* cited by examiner

RADIO (NR) MULTI-INPUT MULTI-OUTPUT (MIMO) CHANNEL STATE INFORMATION (CSI) DESIGN FOR SMALL BANDWIDTH PART (BWP)

This application is a U.S. National Phase of International Application No. PCT/CN2020/083800, filed Apr. 8, 2020, which is hereby incorporated by reference in its entirety.

BACKGROUND

Field

The described aspects generally relate to measuring and reporting channel information in wireless communications. For example, some aspects of this disclosure relate to designs for channel state information (CSI) for a small bandwidth part (BWP) and/or a small number of subbands.

Related Art

A user equipment (UE) communicating with a base station (for example, an evolved Node B (eNB)) over a communication link can measure channel properties of the communication link. For example, the UE can measure how a signal propagates on a downlink channel from the base station to the UE. The UE can generate a channel state information (CSI) report based on the measured channel properties. The UE can transmit the CSI report to the base station. The base station can use the received CSI report to adapt its transmission based on the channel properties reported by the UE.

SUMMARY

Some aspects of this disclosure relate to apparatuses and methods for implementing capability signaling design for 3rd Generation Partnership Project (3GPP) release 15 (Rel-15) and/or release 16 (Rel-16) multi-input multi-output (MIMO) enhancement. For example, systems and methods are provided implementing designs for New Radio (NR) MIMO channel state information (CSI) for a small bandwidth part (BWP) and/or a small number of subbands.

Some aspects of this disclosure relate to a user equipment (UE). The UE includes a transceiver configured to communicate over a wireless network with a base station and a processor communicatively coupled to the transceiver. The processor receives, using the transceiver and from the base station, a channel state information (CSI) reporting configuration message. The processor further determines, using the CSI reporting configuration message, that a number of physical resource blocks (PRBs) of a bandwidth part (BWP) associated with the CSI reporting configuration message is less than a threshold number. The processor also generates a CSI report for the BWP and transmits, using the transceiver, the CSI report to the base station.

In some examples, the processor is further configured to transmit, using the transceiver and to the base station, a message indicating that the UE is configured to generate the CSI report for the BWP. In some examples, the message further indicates one or more codebook types for which the UE is configured to generate the CSI report for the BWP. In some examples, the processor is configured to generate the CSI report for at least one of a 3rd Generation Partnership Project (3GPP) release 15 (Rel-15) Type I Single Panel CSI codebook, Rel-15 Type I Multi Panel CSI codebook, Rel-15 Type II CSI codebook, Rel-15 Type II Port Selection CSI codebook, release 16 (Rel-16) Type II CSI codebook, or Rel-16 Type II Port Selection CSI codebook.

In some examples, the CSI report is associated with one subband and the CSI report includes a wideband channel quality indicator (CQI) and a wideband precoding matrix indicator (PMI). In these examples, a size of the subband is equal to a size of the BWP.

In some examples, the CSI report is associated with one subband for precoding matrix indicator (PMI). Alternatively, the CSI report is associated with two subbands for PMI. In this example and in response to the number of the PRBs of the BWP being even, a number of the PRBs of each of the two subbands is half of the number of the PRBs of the BWP. However, in response to the number of the PRBs of the BWP being odd, one of the two subbands has one PRB less than other one of the two subbands.

In some examples, in response to a csi-ReporuingBand of the CSI reporting configuration message not configured or having a bitmap with value of 0 for each bit of the bitmap, the processor is configured to determine that an error has occurred or is configured to generate the CSI report including a wideband channel quality indicator (CQI) and a wideband precoding matrix indicator (PMI)

Some aspects of this disclosure relate to a method. The method includes receiving, by a user equipment (UE) and from a base station, a channel state information (CSI) reporting configuration message. The method further includes determining, using the CSI reporting configuration message, that a number of physical resource blocks (PRBs) of a bandwidth part (BWP) associated with the CSI reporting configuration message is less than a threshold number. The method can also include generating a CSI report for the BWP for at least one of a 3rd Generation Partnership Project (3GPP) release 15 (Rel-15) Type 1 Single Panel CSI codebook, Rel-15 Type 1 Multi Panel CSI codebook, Rel-15 Type II CSI codebook, Rel-15 Type II Port Selection CSI codebook, release 16 (Rel-16) Type II CSI codebook, or Rel-16 Type II Port Selection CSI codebook. The method also includes transmitting the CSI report to the base station.

Some aspects of this disclosure relate to a non-transitory computer-readable medium storing instructions. When the instructions are executed by a processor of a user equipment (UE), the instructions cause the processor to perform operations including receiving, by the UE and from a base station, a channel state information (CSI) reporting configuration message. The operations further include determining, using the CSI reporting configuration message, that a number of physical resource blocks (PRBs) of a bandwidth part (BWP) associated with the CSI reporting configuration message is less than a threshold number. The operations further include generating a CSI report for the BWP for at least one of a 3rd Generation Partnership Project (3GPP) release 15 (Rel-15) Type I Single Panel CSI codebook, Rel-15 Type I Multi Panel CSI codebook, Rel-15 Type II CSI codebook, Rel-15 Type II Port Selection CSI codebook, release 16 (Rel-16) Type II CSI codebook, or Rel-16 Type II Port Selection CSI codebook. The operations also include transmitting the CSI report to the base station.

Some aspects of this disclosure relate to a base station. The base station includes a transceiver configured to communicate over a wireless network with a user equipment (UE) and a processor communicatively coupled to the transceiver. The processor receives, using the transceiver and from the UE, a message indicating that the UE is configured to generate a channel state information (CSI) for a bandwidth part (BWP) having physical resource blocks (PRBs) less than a threshold number. The process transmits, using the transceiver and to the UE, a CSI reporting configuration message with the BWP having PRBs less than the threshold number. The processor can also receive, using the transceiver and from the UE, a CSI report for the BWP and adapt data transmission(s) to the UE based on the CSI report.

Some aspects of this disclosure relate to a user equipment (UE). The UE includes a transceiver configured to communicate over a wireless network with a base station and a processor communicatively coupled to the transceiver. The processor receives, using the transceiver and from the base station, a channel state information (CSI) reporting configuration message. The processor determines, using the CSI reporting configuration message, a parameter and compares the determined parameter with a threshold. The processor generates a CSI report in response to the parameter being greater than or equal to the threshold and transmits, using the transceiver, the CSI report to the base station In some examples, the parameter includes a maximum number of non-zero coefficient and the threshold has a value of 2 in response to a rank indicator (RI) having a value of 1 or 2, has a value of 3 in response to the RI having a value of 3, and has a value of 4 in response to the RI having a value of 4.

In some examples, the CSI reporting configuration message includes reporting band information and the parameter includes a number of CSI subbands determined from the reporting band information. For example, the reporting band information includes a bitmap and the processor is configured to determine the number of CSI subbands based on a number of bits having a value of 1 in the bitmap. In some examples, the threshold includes a minimum number of CSI subbands and has a value of 5 in response to a rank indicator (RI) having a value of 1 or 2, has a value of 9 in response to the RI having a value of 3, and has a value of 13 in response to the RI having a value of 4. In some examples, the threshold includes a minimum number of CSI subbands and has a value of 5 in response to a rank indicator (RI) having a value of 3 or 4.

In some examples, the processor is configured to generate the CSI report for release 16 (Rel-16) Type II codebook.

In some examples, the processor is configured to transmit, using the transceiver and to the base station, a message including the threshold used by the UE to determine whether to generate the CSI report.

Some aspects of this disclosure relate to a method. The method includes receiving, by a user equipment (UE) and from a base station, a channel state information (CSI) reporting configuration message. The method also includes determining, using the CSI reporting configuration message, a parameter and comparing the determined parameter with a threshold. The method further includes generating a CSI report in response to the parameter being greater than or equal to the threshold, wherein the CSI report is generated for release 16 (Rel-16) Type II codebook. The method also includes transmitting the CSI report to the base station.

Some aspects of this disclosure relate to a non-transitory computer-readable medium storing instructions. When the instructions are executed by a processor of a user equipment (UE), the instructions cause the processor to perform operations including receiving, by the UE and from a base station, a channel state information (CSI) reporting configuration message. The operations also include determining, using the CSI reporting configuration a parameter and comparing the determined parameter with a threshold. The operations further include generating a CSI report in response to the parameter being greater than or equal to the threshold, wherein the CSI report is generated for release 16 (Rel-16) Type II codebook. The operations also include transmitting the CSI report to the base station.

Some aspects of this disclosure relate to a base station. The base station includes a transceiver configured to communicate over a wireless network with a user equipment (UE) and a processor communicatively coupled to the transceiver. The processor receives, using the transceiver and from a user equipment (UE), a message including a threshold used by the UE to determine whether to generate a CSI report. The processor transmits, using the transceiver and to the UE, a CSI reporting configuration message. The processor can also receive, using the transceiver and from the UE, a CSI report for the BWP and adapt data transmission(s) to the UE based on the CSI report.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
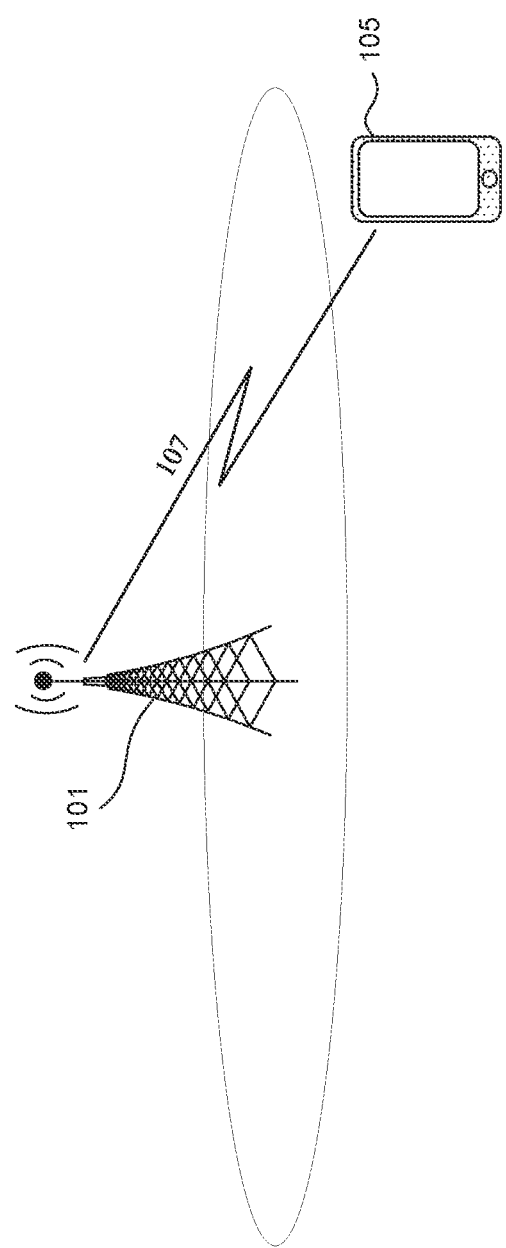
FIG. 1 illustrates an example system implementing designs for New Radio (NR) multi-input multi-output (MIMO) channel state information (CSI) for small bandwidth part (BWP) and/or small number of subbands, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing capability signaling design for Rel-15 and/or Rel-16 MIMO enhancement. For example, systems and methods are provided for CSI reporting when a number of physical resource blocks (PRBs) in a BWP is less than a threshold number (for example, 24 PRBs). Additionally, systems and methods are provided for CSI reporting (for example, for Rel-16 Type II CSI) when the number of subbands is small.

According to some aspects, a UE that operates according to Release 15 (Rel-15) and/or Release 16 (Rel-16) New Radio (NR) of 5th generation (5G) wireless technology for digital cellular networks as defined by 3rd Generation Partnership Project (3GPP) can report channel state information (CSI) to the network with which the UE communicates. For example, the UE can report the CSI to the base station (e.g., a next generation node B (gNB)) with which the UE communicates. According to some aspects, the CSI report can include, but is not limited to, channel quality indicator (CQI), precoding matrix indicator (PMI), CSI-RS resource indicator (CRI), SS/PBCH (synchronization signals (SS)/physical broadcast channel (PBCH)) Block Resource indicator (SSBRI), layer indicator (LI), rank indicator (RI), and/or L1-RSRP (L1-reference signal received power) associated with at least a communication link on which the network communicates with the UE.

The resources (for example, time and/or frequency resources) used by the UE to report the CSI are controlled by the base station (e.g., the gNB). According to some example, the resources for the CSI reporting, the CSI reporting configuration, and/or CSI codebook types can be set by the base station during a Radio Resource Control (RRC) connection setup process.

According to some aspects, before connecting to the base station, the UE can search for a cell to attach. After completing the search, the UE can perform the RRC connection setup process. In one example, the UE can send an attach request to the base station and/or a mobility management entity (MME) associated with the base station. In some examples, the attach request can include an identifier of the UE. In some aspects, if MME accepts the attach request, MME can send a setup request to, for example, the base station. In some example, after receiving the setup request, and if the base station does not know the capabilities of the UE, the base station can send a request to the UE to request the capabilities of the UE. According to some aspects, the UE can send its capabilities to the base station. In response, the base station can send an RRC connection reconfiguration message back to the UE. Then the UE can start data communication using the base station.

According to some aspects, the RRC setup (as discussed above as one example connection setup) can configure the CSI reporting at the UE. For example, the RRC connection reconfiguration message (or any other RRC message) can include information and/or instructions for configuring the CSI reporting at the UE. Rel-15 and Rel-16 can include different CSI reporting configurations with their associated CSI codebook types. As a non-limiting example, New Radio (NR) Rel-15116 multi-input multi-output (MIMO) can support 6 types of CSI reporting configurations with their associated CSI codebook. These CSI codebook types can include codebook types for Rel-15 Type I Single Panel; Rel-15 Type I Multi Panel; Rel-15 Type II CSI; Rel-15 Type II CSI with port selection; Rel-16 Type II CSI; and Rel-16 Type II CSI with port selection.

According to some aspects, the base station can send a CSI report configuration message (for example in an RRC message) for configuring the CSI reporting at the UE. The CSI report configuration message can be associated with a single downlink bandwidth part (BWP). The CSI report configuration message can indicate the BWP to the UE for channel measurement by, for example, including an identifier (ID) associated with the BWP (for example, a BWP ID). The CSI report configuration message can also include the codebook configuration (and/or information associated with the codebook configuration) for the UE. The CSI report configuration message can also include one or more parameters indicating the scheduling method of the CSI report (for example, whether the CSI report is periodic, aperiodic, etc.)

The CSI report configuration message can also include one or more parameters indicating the reporting granularity in frequency domain. For example, the NR Rel-15/16 MIMO CSI reports can be configured based on 3 configurations a. cqi-FormatIndicator: wideband or subband CQI (channel quality indicator), b. pmi-FormatIndicator: wideband or subband PMI (precoding matrix indicator), c. csi-ReportingBand: subband configuration.

The CSI report configuration message can include cqi-FormatIndicator, pmi-FormatIndicator, and/or csi-ReportingBand.

As discussed in more detail below, subband configuration can indicate to the UE the number of subbands within the BWP. In some examples, the subband configuration can include a bitmap. This bitmap can indicate to the UE the number of subbands in the BWP and also for which subband(s) the UE has to report the CSI. In one example, a value of "0" in the bitmap for a subband can indicate that UE does not need to report the CSI for that subband. A value of "1" in the bitmap for another subband can indicate that UE needs to report the CSI for that subband.

The base station, using for example the CSI report configuration message and as indicated by, for example, cqi-FormatIndicator, can request the UE to report wideband CQI (channel quality indicator) or subband CQI. In the case of wideband CQI, the UE can report one value for CQI for the whole BWP. In the case of subband CQI, the UE can report one or more values of CQI based on the bitmap of the subband configuration.

Similarly, the base station, using for example the CSI report configuration message and as indicated by, for example, pmi-FormatIndicator, can request the UE to report wideband PMI (precoding matrix indicator). In the case of wideband PMI, the UE can report one value for PMI for the whole BWP. In the case of subband PMI, the UE can report one or more values of PMI based on the bitmap of the subband configuration.

Although some examples of the contents of the CSI report configuration message are provided above, the aspects of this disclosure are not limited to these examples and the CSI report configuration message can include less, more, or other parameters, instructions, and/or information.

According to some aspects, the subband configuration (csi-ReportingBand) can be a function of the size of the BWP. Table 1 provides an exemplary subband configuration.

TABLE 1

Configurable Subband Sizes

| Bandwidth part (PRBs) | Subband size (PRBs) |
|---|---|
| <24 | N/A |
| 24-72 | 4, 8 |
| 73-144 | 8, 16 |
| 145-275 | 16, 32 |

In one example, as indicated in Table 1, if the BWP has 24 physical resource blocks (PRBs), the subband size can be 4 or 8 PRBs. For example, if the subband size is 4 PRBs, then the BWP will have 6 subbands. In this example, the subband configuration in the CSI report configuration message can include a bitmap with 6 bits, each bit associated with one subband. Depending on the value of the bit (for example, "1" or "0"), the UE can report (or not report) the CSI for that bit.

However, as illustrated in Table 1, for a BWP with sizes less than 24 PRBs (in other words the number of PRBs for this BWP being less than 24), no subband is defined for CSI reporting.

Additionally, the base station can configure the UE to report any subset of subbands within all the subbands, which include special case of 1 subband or 2 subbands. However, the number of subbands may not be enough for compression, and if it is used can result in reports that are not accurate and/or not useful for the base station. In other words, in some examples in Rel-15, a large number of subbands can be used for CSI reporting. A large number of subbands can result in a large overhead. In Rel-16, compression mechanism(s) is (are) used to reduce the overheard. However, if the number of subbands is small, then the compression can produce undesirable results (for example, CSI reports that are not valid, are not accurate, and/or not useful for the base station).

According to some aspects of this disclosure, systems and methods are discussed to provide capability signaling design for Rel-15 and/or Rel-16 MIMO enhancement. For example as discussed blow, systems and methods are provided for CSI reporting when a number of PRBs of a BWP is less than a threshold number (for example, 24 PRBs). Additionally, or alternatively, systems and methods are provided for CSI reporting (for example, for Rel-16 Type II CSI) when the number of subbands is small.

FIG. 1 illustrates an example system 100 implementing designs for New Radio (NR) multi-input multi-output (MIMO) channel state information (CSI) for a small bandwidth part (BWP) and/or a small number of subbands, according to some aspects of the disclosure. Example system 100 is provided for the purpose of illustration only and does not limit the disclosed aspects. System 100 may include, but is not limited to, network node (for example, a base station such as eNB, gNB, etc.) 101 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 15 (Rel-15), Release 16 (Rel-16) or later. UE 105 can include, but is not limited to, wireless communication devices, smart phones, laptops, desktops, tablets, personal assistants, monitors, televisions, wearable devices, Internet of Things (IoTs), vehicle's communication devices, and the like. Network node 101 (herein referred to as base station) can include nodes configured to operate based on a wide variety of wireless communication techniques such as, but not limited to, techniques based on 3GPP standards. For example, base station 103 can include nodes configured to operate using Rel-15. Rel-16, or later.

UE 105 can be connected to and can be communicating with base station 101 using one or more communication links 107. According to some aspects, UE 105 can be configured to measure how signal propagates on a downlink channel on communication link 107 from base station 101 to UE 105. UE 105 can generate a channel state information (CSI) report based on the measured channel properties. UE 105 can transmit the CSI report to base station 101. Base station 101 can use the received CSI report to adapt its transmission based on the channel properties reported by UE 105. According to some aspects, UE 105 and base station 101 are configured to implement mechanisms for CSI reporting when a BWP is small (for example, but not limited to, a BWP having less than a threshold number (e.g., 24) of PRBs). Additionally, or alternatively, UE 105 and base station 101 are configured to implement mechanisms for CSI reporting (for example, for Rel-16 Type II CSI) when the number of subbands is small.

According to some aspects, before connecting to base station 101, UE 105 can search for a cell to attach. After completing the search, UE 105 can perform a Radio Resource Control (RRC) connection setup process. In one example, UE 105 can send an attach request to base station 101 and/or a mobility management entity (MME) (not shown) associated with base station 101. In some examples, the attach request can include an identifier of UE 105. In some aspects, if MME accepts the attach request, MME can send a setup request to, for example, base station 101. In some example, after receiving the setup request, and if base station 101 does not know the capabilities of UE 105, base station 101 can send a request to UE 105 to request the capabilities of UE 105. According to some aspects, UE 105 can send its capabilities to base station 101. In response, base station 101 can send an RRC connection reconfiguration message back to UE 105. Then UE 105 can start data communication using base station 101. Additionally, UE 105 can send CSI report(s) to the base station.

According to some aspects, UE 105 is configured to report the CSI for a small BWP (for example, a BWP having less than a threshold number of PRBs). In some examples, the threshold number of PRBs include 24 PRBs. However, other numbers of PRBs can be used as the threshold number.

In some examples, UE 105 can report the CSI for the small BWP for Rel-15 Type I CSI. Rel-15 Type I can include Rel-15 Type I Single Panel and Rel-15 Type I Multi Panel or Rel-15 Type I Single Panel only. In this example, UE 105 does not report the CSI for the small BWP for Rel-15 Type II or Rel-16 Type CSI.

Alternatively, UE 105 can report the CSI for the small BWP for Rel-15 Type I CSI and Rel-15 Type II CSI. Rel-15 Type I can include Rel-15 Type I Single Panel and Rel-15 Type I Multi Panel or Rel-15 Type I Single Panel only. Rel-15 Type II can include Rel-15 Type II CSI and Rel-15 Type II CSI with port selection. In this example, UE 105 does not report the CSI for the small BWP for Rel-16 Type CSI.

Alternatively, UE 105 can report the CSI for the small BWP for Rel-15 Type I CSI, Rel-15 Type II CSI, and Rel-16 Type II CSI. Rel-15 Type I can include Rel-15 Type I Single Panel and Rel-15 Type I Multi Panel or Rel-15 Type I Single Panel only. Rel-15 Type II can include Rel-15 Type II CSI and Rel-15 Type II CSI with port selection. Rel-16 Type II CSI can also include Rel-16 Type II CSI with port selection.

According to some aspects, UE 105 can be configured to indicate its capability to base station 101. For example, during the exemplary initial communication discussed above (or any other initial access), UE 105 can communicate its capability to base station 101. UE 105 can communicate to base station 101 whether UE 105 can support CSI report for the small BWP (for example, a BWP having less than the threshold number of PRBs (e.g., 24 PRBs)) for the following codebook type: Rel-15 Type I CSI; Rel-15 Type II CSI; and/or Rel-16 Type I CSI. In other words, UE 105 can indicate to base station 101 whether UE 105 supports CSI report for the small BWP. Additionally, UE 105 can indicate to base station 101 for which codebook types UE 105 supports the CSI report for the small BWP. According to some examples, if UE 105 does not support a certain codebook type for the small BWP, UE 105 is not expected to be configured with the CSI reporting of the corresponding codebook type when the small BWP is used.

According to some aspects, if UE 105 supports CSI report for the small BWP for a certain codebook type, the network can define the number of CSI subbands for the small BWP for that codebook type. In one exemplary implementation, for Rel-15 Type I CSI and for Rel-15 Type II CSI, the number of the CSI subband for the small BWP (for example, the BWP having less than the threshold number of PRBs (e.g., 24 PRBs)) is one. In this example, UE 105 is expected to report wideband CQI and/or wideband PMI.

In another example, for Rel-16 Type II CSI, UE 105 reports wideband CQI. For the PMI, UE 105 can have at least two options for reporting PMI. In one example, the number of PMI subbands can be R, where R is 1 or 2 subject to the capabilities of UE 105. In this example, the number of CSI subbands is also R, where R is 1 or 2 subject to the capabilities of UE 105. In some example, the value of R can be configured by the network (e.g., base station 101 and/or network associated with base station 101). In this example, the value of R is the number of PMI subbands per the CSI subband.

According to some aspects, Table 1 as discussed above is updated as shown below in Table 2. In one example, for the small BWP (for example, the BWP having less than the threshold number of PRBs (e.g., 24 PRBs)), the CSI subband size is the same as the size of the BWP. In this example, the network (for example base station 101 and/or network associated with base station 101) can configure csi-ReportingBand even for the small BWP.

TABLE 2

Configurable Subband Sizes

| Bandwidth part (PRBs) | Subband size (PRBs) |
|---|---|
| <24 | Number of PRBs in bandwidth part |
| 24-72 | 4, 8 |
| 73-144 | 8, 16 |
| 145-275 | 16, 32 |

As discussed above, the CSI report configuration message can also include one or more parameters indicating the reporting granularity in frequency domain. For example, the CSI report configuration message can include:

a. cqi-FormatIndicator: wideband or subband CQI (channel quality indicator), b. pmi-FormatIndicator: wideband or subband PMI (precoding matrix indicator).

c. csi-ReportingBand: subband configuration.

According to some aspects, for Rel-15 Type I CSI and for Rel-15 Type II CSI, when UE 105 supports CSI reporting for the small BWP (for example, the BWP having less than the threshold number of PRBs (e.g., 24 PRBs)), then UE 105 reports only wideband PMI and wideband CQI based on the whole BWP. In other words, the network (for example, base station 101 and/or network associated with base station 101) can configure cqi-FormatIndicator to be wideband CQI and pmi-FormatIndicator to wideband PMI. The network can communicate these values to UE 105 using, for example, RRC message(s). In this example, the network does not configure subband CQI or subband PMI. Additionally or alternatively, UE 105 can be configured to report only wideband PMI and wideband CQI based on the whole BWP without instructions from base station 101.

According to some aspects, for Rel-16 Type II CSI, when UE 105 supports CSI reporting for the small BWP (for example, the BWP having less than the threshold number of PRBs (e.g., 24 PRBs)), then UE 105 reports wideband CQI based on the whole BWP. In this example, UE 105 does not report subband CQI. Additionally, for PMI, UE 105 can use different numbers of PMI subbands. In one example, the number of PMI subbands is 1 and the PMI report is based on the whole BWP. Alternatively, the number of subbands is 2. In this example, if the BWP has even number of PRBs, both PMI subbands have $$\frac{BWP}{2}$$

PRBs. However, if the BWP has odd number of PRBs, then one PMI subband ha $$\frac{BWP - 1}{2}$$

PRBs and the other PMI subband has $$\frac{BWP + 1}{2}$$

PRBs. In some examples, the network (for example, base station 101 and/or network associated with base station 101) configures the number of the PMI subbands (using, for example, RRC message(s)) and communicates the number of the PMI subbands to UE 105.

According to some examples, for the small BWP (for example, the BWP having less than the threshold number of PRBs (e.g., 24 PRBs)), the csi-ReportingBand in the CSI report configuration message may have not be configured. Additionally, or alternatively, the csi-ReportingBand may have been configured but its bitmap includes value "0" for all its bits. In these examples, UE 105 may consider the csi-ReportingBand as an error and may not report any CSI. Alternatively, UE 105 may report only wideband PMI and wideband CQI. For example, for Rel-15 Type I and Rel-15 Type II, UE 105 can use the whole BWP to measure and report CSI. For Rel-16 Type, the number of PMI subbands can be either 1 or R, where R is either 1 or 2.

According to some examples, for the small BWP (for example, the BWP having less than the threshold number of PRBs (e.g., 24 PRBs)), the csi-ReportingBand may be configured with only one subband (for example, only one bit is set to value "1" in the bitmap). In this example, for Rel-15 Type I and Rel-15 Type II. UE 105 may report only wideband PMI and wideband CQI. For example. UE 105 may ignore cqi-FormatIndicator and pmi-FormatIndicator received in the CSI reporting configuration message. Additionally, or alternatively, UE 105 may only expect that cqi-FormatIndicator is set to wideband CQI and pmi-FormatIndicator is set to wideband PMI. The designs for Rel-16 Type when the number of subbands is low is discussed in more detail below.

According to some aspects, Rel-16 Type II provides a reduction in CSI reporting overhead. When a large number of subbands are used in the CSI report, the overhead can be large. In CSI reporting methods in Rel-16 Type II, compression mechanism(s) is (are) used to reduce the overheard. However, if the number of subbands is small, then the compression used in Rel-16 Type II can produce undesirable results (for example, CSI reports that are not valid, are not accurate, and/or not useful for the base station).

In some examples of Rel-16 Type II CSI reporting, the number of CSI subbands, $N_{SB}$, can be between 1 and 19. The number of PMI subbands can be $N_3 \approx R^*N_{SB}$, where R can be 1 or 2. In some examples, the value of R is determined by the network (for example, base station 101 and/or a network associated with base station 101). A number of selected frequency basis can depend on a parameter $p_v$ (which is illustrated below in Table 3). The number of selected frequency basis can be $$M_v = \left\lceil p_v \times \frac{N_3}{R} \right\rceil.$$

The number of spatial basis is L (which is illustrated below in Table 3). Using the number of selected frequency basis and the number of spatial basis, a maximum number of non-zero coefficient can be determined as $k_0=[\beta \times 2LM_1]$. Here, $M_1$ is $M_v$ when $v=1$. Parameter $\beta$ is also illustrated below in Table 3. The number of non-zero coefficient $k_0$ can be used for the compression mechanism to reduce the overheard. For example, when preparing and reporting the CSI report, UE 105 cannot report more than $k_0$ non-zero coefficient for each layer, according to some aspects. Additionally. or alternatively, the total number of non-zero coefficient cannot exceed $2*k_0$, according to some aspects. In some examples, UE 105 is configured to communicate the parameter $k_0$ to the network as, for example, part of the CSI report.

Table 3 below provides one exemplary setting that includes 8 configurations for different values of the number of spatial basis L, parameter $p_v$, and parameter $\beta$.

TABLE 3

Codebook Parameter Configurations for L, $p_v$, and $\beta$

| paramCombination-r16 | L | $p_v$ $v \in \{1, 2\}$ | $p_v$ $v \in \{3, 4\}$ | $\beta$ |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |

TABLE 3-continued

Codebook Parameter Configurations for L, $p_v$, and $\beta$

| paramCombination-r16 | L | $p_v$ $v \in \{1, 2\}$ | $p_v$ $v \in \{3, 4\}$ | $\beta$ |
|---|---|---|---|---|
| 6 | 4 | ½ | ¼ | ½ |
| 7 | 6 | ¼ | — | ½ |
| 8 | 6 | ¼ | — | ¾ |

However, as discussed above, when the number of the subbands is small, some of the parameter settings are not reasonable based on the number of the subbands. As a non-limiting examples, for a small number of subbands and using the parameters in Table 3, parameter $k_0$ can be calculated to have value 1. However, value 1 for parameter $k_0$ is invalid because to report each layer, UE 105 needs to report at least 2 non-zero coefficient per layer to cover the vertical and horizontal polarization. Therefore, the compression used in Rel-16 Type II can produce undesirable results (for example, CSI reports that are not valid, are not accurate, and/or not useful for the base station).

According to some aspects, systems and methods are provided for CSI reporting (for example, for Rel-16 Type II CSI) when the number of subbands is small such that the CSI reporting does not include the issues discussed above.

According to some aspects, in Rel-16 Type II CSI, the CSI is reported with some minimum configuration. In other words, before generating and/or sending the CSI report, UE 105 can determine whether a minimum configuration is met. If the minimum configuration is met, then UE 105 can generate and send the CSI report. However, if the minimum configuration is not met. UE 105 does not generate and transmit the CSI report. According to some example, during the exemplary initial communication discussed above (or any other initial access), UE 105 can communicate the minimum configuration to base station 101.

According to some aspects, the minimum configuration can include minimum resulting number of non-zero coefficient as indicated by parameter $k_0$ discussed above. For example, if a rank indicator (RI) is 1 or 2, the minimum value of parameter $k_0$ is 2. In other words, if $k_0<2$, UE 105 does not send the CSI report for Rel-16 Type II (UE 105 does not report Type II CSI). As discussed above, RI can be one of the parameters report in the CSI report by UE 105. Base station 101 can use the received RI to select a transmission layer in a downlink data transmission.

Additionally, or alternatively, if RI is 3, the minimum value of parameter $k_0$ is 3. In other words, if $k_0=2$, UE 105 can send the CSI report for Rel-16 Type II associated with RI=1 or 2 (UE 105 reports RI=1/2 layer CSI report). In this example, UE 105 does not send the CSI report for Rel-16 Type II associated with RI=3 or 4 (UE 105 does not report RI=3/4 layer CSI report).

Additionally, or alternatively, if RI is 4, the minimum value of parameter $k_0$ is 4. In other words, if $k_0=3$, UE 105 can send the CSI report for Rel-16 Type II associated with RI=1, 2, or 3 (UE 105 reports RI=1/2/3 layer CSI report). In this example, UE 105 does not send the CSI report for Rel-16 Type II associated with RI=4 (UE 105 does not report RI=4 layer CSI report).

According to some aspects, the minimum configuration can include a minimum number of CSI subbands $N_{SB}$ based on the parameter configurations. The minimum number of CSI subbands $N_{SB}$ can determine the minimum resulting number of non-zero coefficient as indicated by parameter $k_0$.

As discussed above, the number of PMI subbands can be $N_3 \approx R*N_{SB}$, where R can be 1 or 2. In some examples, the value of R is determined by the network (for example, base station 101 and/or a network associated with base station 101). A number of selected frequency basis can depend on a parameter $p_v$. The number of selected frequency basis can be $$M_v = \left\lceil p_v \times \frac{N_3}{R} \right\rceil.$$

The number of spatial basis is L. Using the number of selected frequency basis and the number of spatial basis, a maximum number of non-zero coefficient can be determined as $k_0=[\beta \times 2LM_1]$. Here, $M_1$ is $M_v$ when v=1. The number of non-zero coefficient $k_0$ can be used for the compression mechanism to reduce the overheard.

According to some aspects, the minimum configuration can include a minimum number of spatial basis L based on the parameter configurations. minimum number of spatial basis L can determine the minimum resulting number of non-zero coefficient as indicated by parameter $k_0$.

As discussed above, one example of the minimum configuration can include a minimum number of CSI subbands $N_{SB}$ based on the parameter configurations. According to some aspects, the minimum number of CSI subbands can be configured by UE 105 and can be sent to base station 101 as capabilities of UE 105. Additionally, or alternatively, the minimum number of CSI subbands can be configured in, for example, the CSI report configuration message. For example, the minimum number of CSI subbands can be configured, explicitly or implicitly, by, for example, csi-ReportingBand in the CSI report configuration message. According to some aspects, the number of CSI subbands is the number of bits with value "1" in the bitmap of csi-ReportingBand. This can be applied to cases where R=1 and R=2.

Table 4 below illustrates one example of using the minimum number of subbands $N_{SB}$ as the minimum configuration. Table 4 below is based on Table 3 above where the minimum number of subbands $N_{SB}$ is added.

TABLE 3

Codebook Parameter Configurations for L, $p_v$, $\beta$, and Minimum Number of CSI Subbands $N_{SB}$

| | | $p_v$ | | | Minimum number of CSI subbands $N_{SB}$ | | |
| --- | --- | --- | --- | --- | --- | --- | --- |
| paramCombination-r16 | L | $v \in \{1, 2\}$ | $v \in \{3, 4\}$ | $\beta$ | $v \in \{1, 2\}$ | $v = 3$ | $v = 4$ |
| 1 | 2 | ¼ | ⅛ | ¼ | 5 | 9 | 13 |
| 2 | 2 | ¼ | ⅛ | ½ | 1 | 5 | 5 |
| 3 | 4 | ¼ | ⅛ | ¼ | 1 | 5 | 5 |
| 4 | 4 | ¼ | ⅛ | ½ | 1 | 1 | 1 |
| 5 | 4 | ¼ | ¼ | ¾ | 1 | 1 | 1 |
| 6 | 4 | ½ | ¼ | ½ | 1 | 1 | 1 |
| 7 | 6 | ¼ | — | ½ | 1 | | |
| 8 | 6 | ¼ | — | ¾ | 1 | | |

According to some examples, for setting 1 (paramCombination-r16=1), to support up to rank 2 (RI=2) CSI reporting, the minimum number of CSI subbands is 5. In these examples, to support up to rank 3 (RI=3) CSI reporting, the minimum number of CSI subbands is 9. And, to support up to rank 4 (RI=4) CSI reporting, the minimum number of CSI subbands is 13

According to some examples, for setting 2 (paramCombination-r6=2), to support up to rank 3 (RI=3) CSI reporting, the minimum number of CSI subbands is 5. In these examples, to support up to rank 4 (RI=4) CSI reporting, the minimum number of CSI subbands is 5.

According to some examples, for setting 3 (paramCombination-r16=3), to support up to rank 3 (RI=3) CSI reporting, the minimum number of CSI subbands is 5. In these examples, to support up to rank 4 CSI reporting, the minimum number of CSI subbands is 5.

Figure 2:
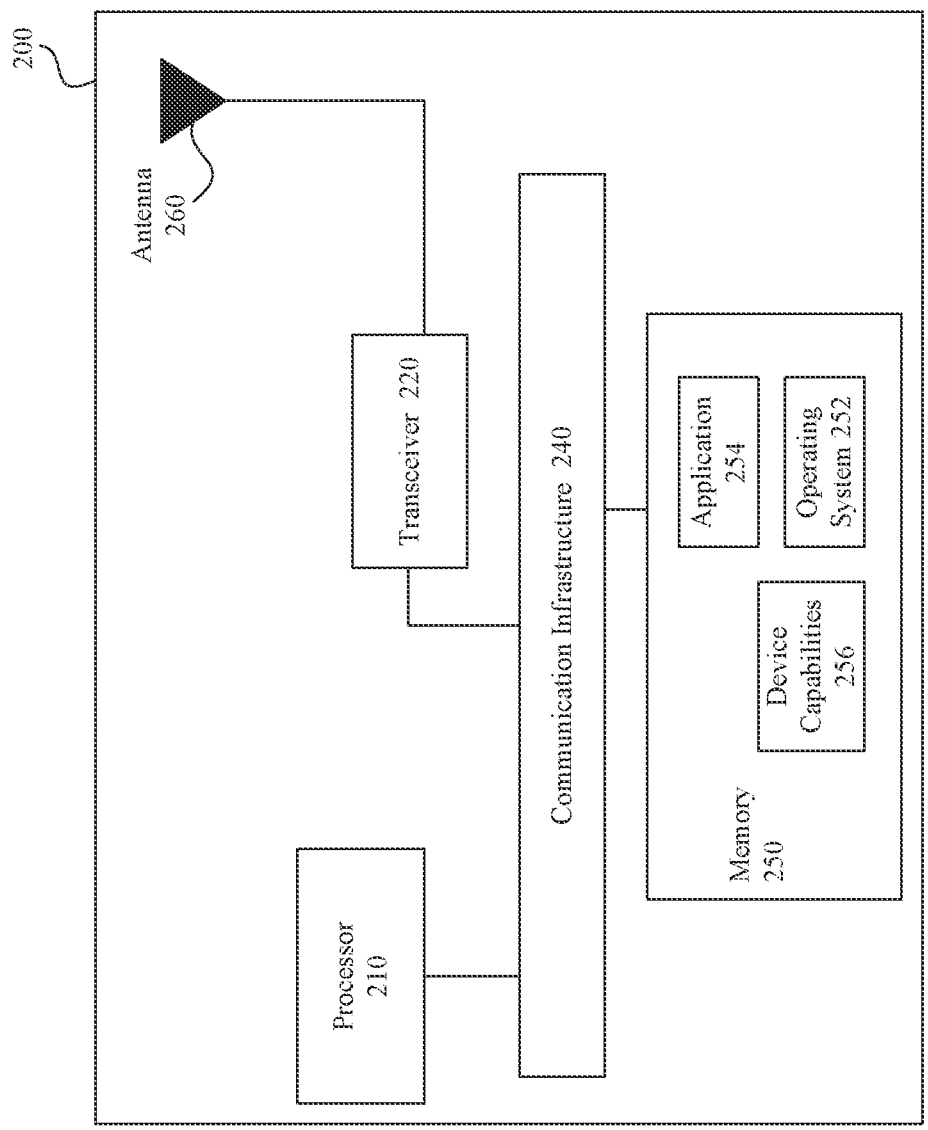
FIG. 2 illustrates a block diagram of an example system of an electronic device implementing designs for New Radio (NR) multi-input multi-output (MIMO) channel state information (CSI) for small bandwidth part (BWP) and/or small number of subbands, according to some aspects of the disclosure.

FIG. 2 illustrates a block diagram of an example system 200 of an electronic device implementing mechanisms for designs for New Radio (NR) multi-input multi-output (MIMO) channel state information (CSI) for a small bandwidth part (BWP) and/or a small number of subbands, according to some aspects of the disclosure. System 200 may be any of the electronic devices (e.g., base station 101, UE 105) of system 100. System 200 includes processor 210, one or more transceivers 220, communication infrastructure 240, memory 250, operating system 252, application 254, and one or more antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220, and memory 250. In some implementations, communication infrastructure 240 may be a bus. Processor 210 together with instructions stored in memory 250 performs operations enabling system 200 of system 100 to implement mechanisms for NR MIMO CSI for a small BWP and/or a small number of subbands, as described herein. Additionally, or alternatively, one or more transceivers 220 perform operations enabling system 200 of system 100 to implement mechanisms for NR MIMO CSI for a small BWP and/or a small number of subbands, as described herein.

One or more transceivers 220 transmit and receive communications signals that support mechanisms for NR MIMO CSI for a small BWP and/or a small number of subbands. Additionally, one or more transceivers 220 transmit and receive communications signals that support mechanisms for measuring communication link(s), and generating and transmitting CSI reports. According to some aspects, one or more transmitters 220 may be coupled to antenna 260. Antenna 260 may include one or more antennas that may be the same or different types. One or more transceivers 220 allow system 200 to communicate with other devices that may be wired and/or wireless. In some examples, one or more transceivers 220 can include processors, controllers, radios, sockets, plugs, buffers, and like circuits/devices used for connecting to and communication on networks. According to some examples, one or more transceivers 220 include one or more circuits to connect to and communicate on wired and/or wireless networks.

According to some aspects of this disclosure, one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220 can include more or fewer systems for communicating with other devices.

In some examples, one or more transceivers 220 can include one or more circuits (including a WLAN transceiver) to enable connection(s) and communication over WLAN networks such as, but not limited to, networks based on standards described in IEEE 802.11.

Additionally, or alternatively, one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220 can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220, implements the methods and mechanisms discussed in this disclosure. For example, processor 210, alone or in combination with computer instructions stored within memory 250, and/or one or more transceiver 220, implements mechanisms for NR MIMO CSI for small BWP. According to some aspects of this disclosure, processor 210, alone or in combination with computer instructions stored within memory 250, and/or one or more transceiver 220, can receive from a base station (for example base station 101 of FIG. 1) a CSI reporting configuration message. Using the received CSI reporting configuration message, processor 210 can determine that a number of physical resource blocks (PRBs) of a bandwidth part (BWP) associated with the CSI reporting configuration message is less than a threshold number (as a non-limiting example, 24 PRBs). However, processor 210 can still generate a CSI report for the BWP and transmit, using one or more transceivers, the CSI report to the base station.

According to some aspects, memory 250 can include device capabilities 256. Device capabilities 256 can include information indicating that device 200 is configured to generate the CSI report for the BWP that has PRBs less than the threshold number. Additionally, or alternatively, device capabilities 256 can include information indicating one or more codebook types for which device 200 is configured to generate the CSI report for the BWP that has PRBs less than the threshold number. Additionally, or alternatively, device capabilities 256 can include the minimum configuration used by device 200 for generating and/or sending the CSI report if the minimum configuration is met (for example, in Rel-16 Type II CSI). Device 200, if operating as for example UE 105, can indicate its capability to base station 101 by sending information stored as device capabilities 256. For example, during the exemplary initial communication discussed above (or any other initial access), device 200 can communicate its device capabilities 256 to base station 101.

Additionally or alternatively, processor 210, alone or in combination with computer instructions stored within memory 250, and/or one or more transceiver 220, implements mechanisms for NR MIMO CSI for small number of subbands. For example, processor 210, alone or in combination with computer instructions stored within memory 250, receives, using transceiver 220 and from base station 101, a channel state information (CSI) reporting configuration message. Processor 210 can determine, using the CSI reporting configuration message, a parameter and can compare the determined parameter with a threshold. Processor 210 can generate a CSI report in response to the parameter being greater than or equal to the threshold and can transmit, using transceiver 220, the CSI report to base station 101. However, if the parameter is less than the threshold, processor 210 does not generate the CSI report.

As discussed in more detail below with respect to FIGS. 3-6, processor 210 can implement different mechanisms for implementing MIMO CSI for a small BWP and/or a small number of subbands as discussed with respect to system 100 of FIG. 1.

Figure 3:
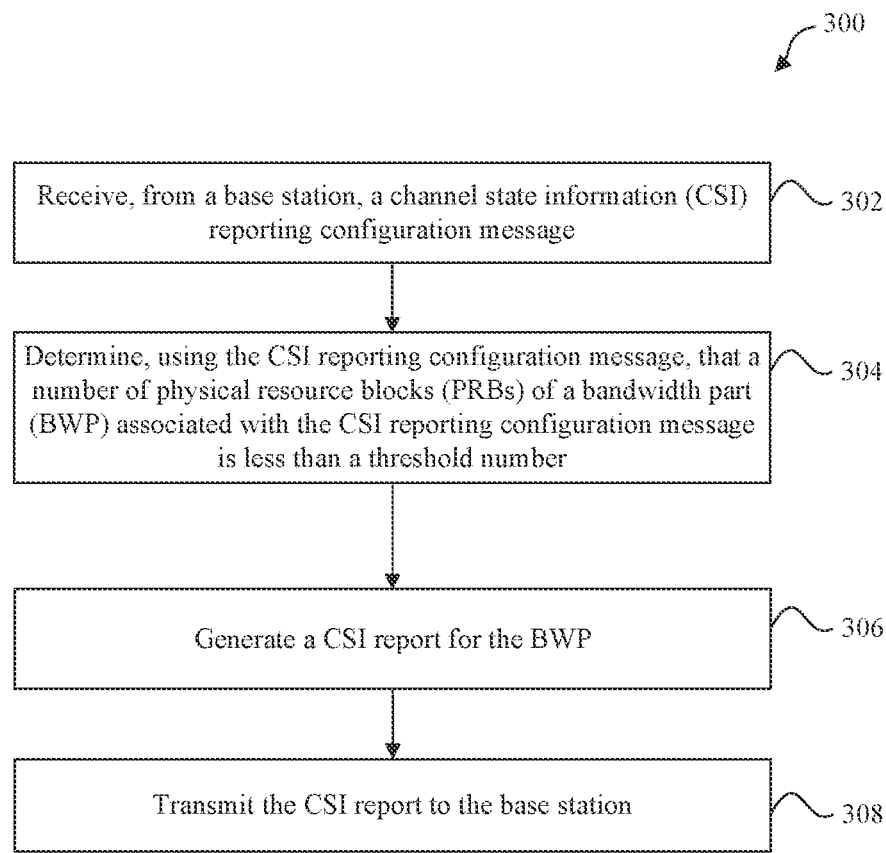
FIG. 3 illustrates an example method for a system (for example a user equipment (UE)) supporting mechanisms for implementing multi-input multi-output (MIMO) channel state information (CSI) for a small bandwidth part (BWP), according to some aspects of the disclosure.

FIG. 3 illustrates an example method 300 for a system (for example a user equipment (UE)) supporting mechanisms for implementing multi-input multi-output (MIMO) channel state information (CSI) for small bandwidth part (BWP), according to some aspects of the disclosure. As a convenience and not a limitation, FIG. 3 may be described with regard to elements of FIGS. 1, 2, and 7. Method 300 may represent the operation of an electronic device (for example, UE 105 of FIG. 1) implementing mechanisms for implementing multi-input multi-output (MIMO) channel state information (CSI) for a small bandwidth part (BWP). Method 300 may also be performed by system 200 of FIG. 2 and/or computer system 700 of FIG. 7. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

At 302, a channel state information (CSI) reporting configuration message is received. For example, UE 105 receives, from base station 101, the CSI reporting message. The CSI reporting configuration message can include information for configuring UE 105 for measuring communication link(s), generating a CSI report, and transmitting the CSI report to base station 101. According to some aspects, the reporting configuration message can include a bandwidth part (BWP) identifier to indicate the BWP to UE 105 for channel measurement. The CSI report configuration message can also include a codebook configuration (and/or information associated with the codebook configuration) for UE 105. The CSI report configuration message can also include one or more parameters indicating the scheduling method of the CSI report (for example, whether the CSI report is periodic, aperiodic, etc.) The CSI report configuration message can also include one or more parameters indicating the reporting granularity in frequency domain. For example, CSI report configuration message can include an indicator associated with channel quality indicator (CQI—for example, cqi-FormatIndicator: wideband or subband CQI), an indicator associated with precoding matrix indicator (PMI—for example pmi-FormatIndicator: wideband or subband PMI), and/or an information associated with subband configuration (for example, csi-ReportingBand).

At 304, using the CSI reporting configuration message, it is determined that a number of physical resource blocks (PRBs) of a bandwidth part (BWP) associated with the CSI reporting configuration message is less than a threshold number. For example, using the BWP identifier, UE 105 determines that the number of PRBs of the BWP is less than the threshold number (as a non-limiting example, 24 PRBs.)

At 306, a CSI report is generated for the BWP. For example, UE 105 generates the CSI report for the BWP based on the information in the CSI report configuration message. At 308, UE 105 can transmit the CSI report to base station 101, where base station 101 can adapt its data transmission(s) to UE 105 based on the CSI report.

In some exemplary aspects, method 300 can also include transmitting, to base station 101, a message indicating that UE 105 is capable of and is configured to generate the CSI report for the BWP (that has the number of PRBs less than the threshold number). Additionally, or alternatively, the message from UE 105 to base station 101 can further indicate one or more codebook types for which UE 105 is capable of and is configured to generate the CSI report for the BWP. According to some examples, the CSI report is generated for at least one of a 3rd Generation Partnership Project (3GPP) release 15 (Rel-15) Type I Single Panel CSI codebook, Rel-15 Type I Multi Panel CSI codebook, Rel-15 Type II CSI codebook, Rel-15 Type II Port Selection CSI codebook, release 16 (Rel-16) Type II CSI codebook, or Rel-16 Type II Port Selection CSI codebook. In some examples, the network (for example, base station 101 and/or a network associated with base station 101) can only be allowed to configure UE 105 to generate the CSI report for a subset of the six CSI codebooks (release 15 (Rel-15) Type I Single Panel CSI codebook, Rel-15 Type I Multi Panel CSI codebook, Rel-15 Type II CSI codebook, Rel-15 Type II Port Selection CSI codebook, release 16 (Rel-16) Type II CSI codebook, and Rel-16 Type II Port Selection CSI codebook).

According to some aspects, the CSI report generated and transmitted by UE 105 can be associated with one subband and the CSI report can include a wideband channel quality indicator (CQI) and a wideband precoding matrix indicator (PMI). In some examples, a size of the subband is equal to a size of the BWP.

In some examples, the CSI report is associated with one subband for precoding matrix indicator (PMI) and a PMI report is based on the whole BWP. Additionally, or alternatively, the CSI report can be associated with two subbands for precoding matrix indicator (PMI). In this example, if the number of the PRBs of the BWP is even, a number of the PRBs of each of the two subbands is half of the number of the PRBs of the BWP. However, if the number of the PRBs of the BWP is odd, one of the two subbands has one PRB less than other one of the two subbands.

According to some aspects, if a csi-ReportingBand of the CSI reporting configuration message is not configured, UE 105 can determine that an error has occurred. Additionally, or alternatively, UE 105 can the CSI report including a wideband CQI and a wideband PMI.

According to some aspects, if a csi-ReportingBand of the CSI reporting configuration message has a bitmap with value of 0 for each bit of the bitmap, UE 105 can determine that an error has occurred or can generate the CSI report including a wideband CQI and a wideband PMI.

Figure 4:
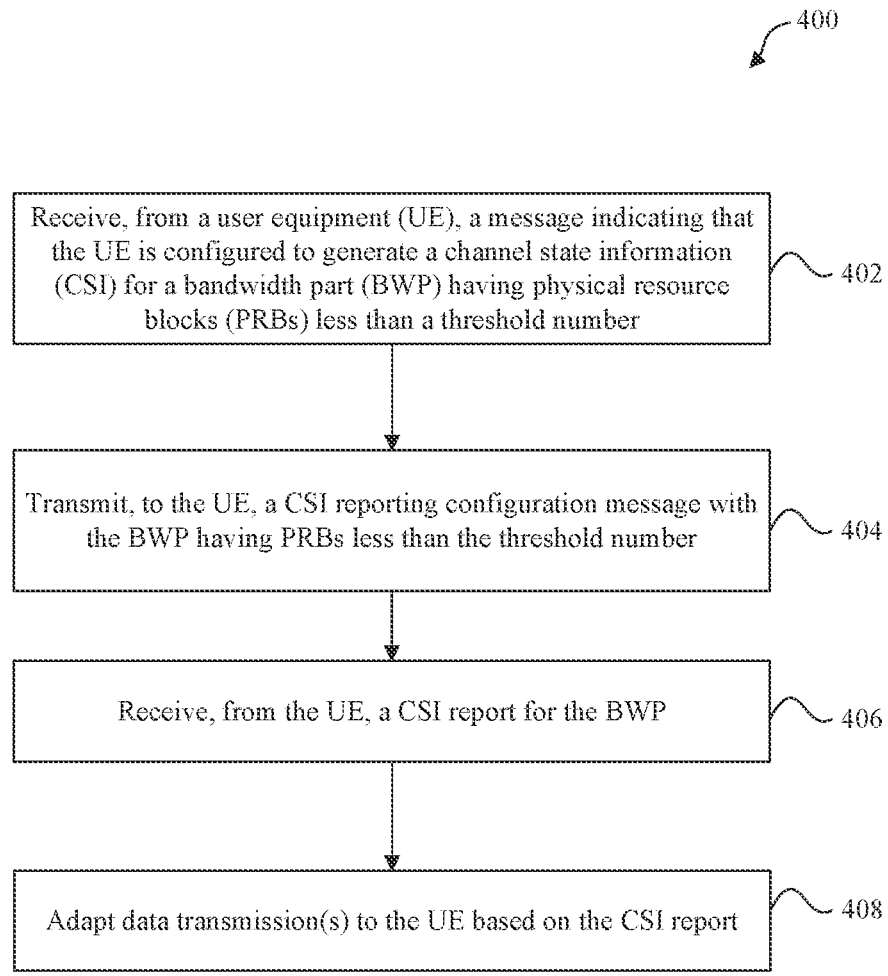
FIG. 4 illustrates an example method for a system (for example a base station) supporting mechanisms for implementing multi-input multi-output (MIMO) channel state information (CSI) for a small bandwidth part (BWP), according to some aspects of the disclosure.

FIG. 4 illustrates an example method 400 for a system (for example a base station) supporting mechanisms for implementing multi-input multi-output (MIMO) channel state information (CSI) for small bandwidth part (BWP), according to some aspects of the disclosure. As a convenience and not a limitation, FIG. 4 may be described with regard to elements of FIGS. 1, 2, and 7. Method 400 may represent the operation of an electronic device (for example, base station 101 of FIG. 1) implementing mechanisms for implementing multi-input multi-output (MIMO) channel state information (CSI) for a small bandwidth part (BWP). Method 400 may also be performed by system 200 of FIG. 2 and/or computer system 700 of FIG. 7. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, a message is received, at, for example, base station 101 and from UE 105, indicating that UE 105 is configured to generate a channel state information (CSI) for a bandwidth part (BWP) having physical resource blocks (PRBs) less than a threshold number. For example, base station 101 receives capabilities of UE 105. The message can indicate that UE 105 is capable of and is configured to generate the CSI report for the BWP (that has the number of PRBs less than the threshold number). Additionally, or alternatively, the message can further indicate one or more codebook types for which UE 105 is capable of and is configured to generate the CSI report for the BWP.

At 404, a CSI reporting configuration message is transmitted to UE 105. The CSI reporting configuration message can include a BWP identifier indicating the BWP having PRBs less than the threshold number. According to some aspects, base station 101 generates the CSI reporting configuration message based, at least in part, on the capabilities of UE 105.

At 406, base station 101 can receive, from UE 105, a CSI report for the BWP. The CSI report include information associated with, for example, the downlink communication link(s) between base station 101 and UE 105. At 408, base station 101 can adapt its data transmission(s) to UE 105 based on the received CSI report.

Figure 5:
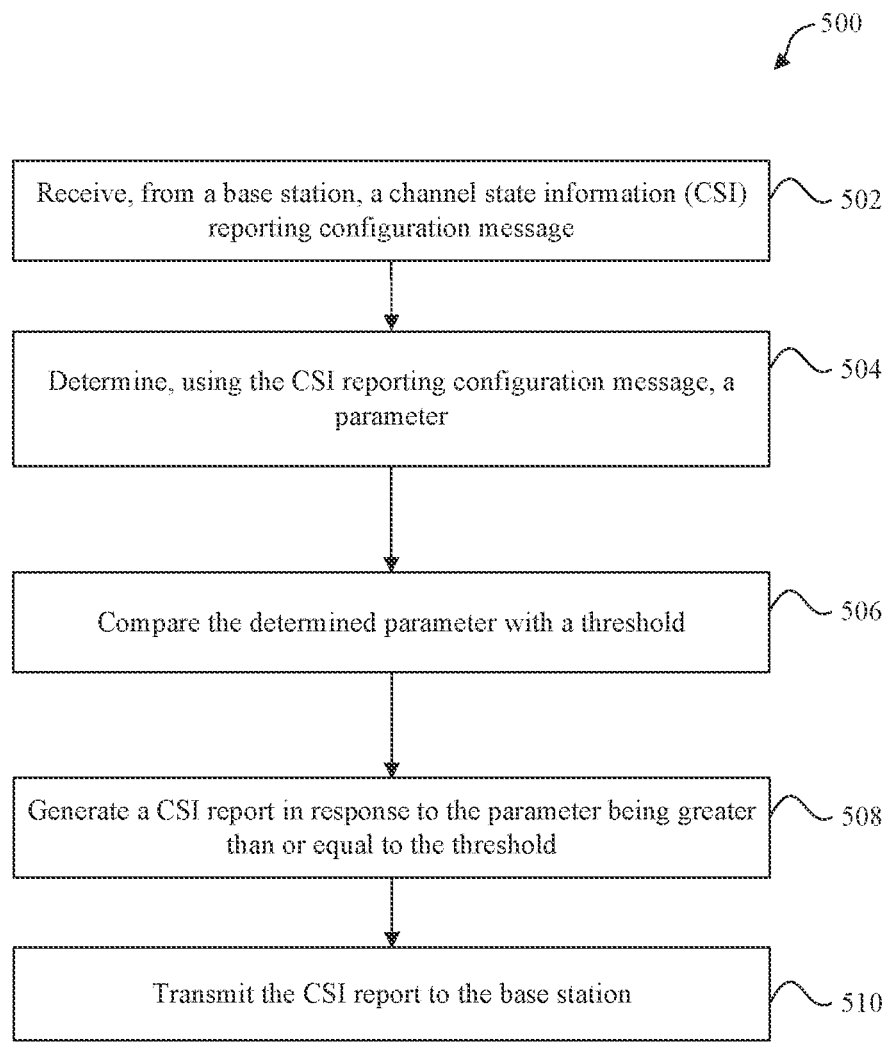
FIG. 5 illustrates an example method for a system (for example a user equipment (UE)) supporting mechanisms for implementing multi-input multi-output (MIMO) channel state information (CSI) for a small number of subbands, according to some aspects of the disclosure.

FIG. 5 illustrates an example method 500 for a system (for example a user equipment (UE)) supporting mechanisms for implementing multi-input multi-output (MIMO) channel state information (CSI) for a small number of subbands, according to some aspects of the disclosure. As a convenience and not a limitation, FIG. 5 may be described with regard to elements of FIGS. 1, 2, and 7. Method 500 may represent the operation of an electronic device (for example, UE 105 of FIG. 1) implementing mechanisms for implementing multi-input multi-output (MIMO) channel state information (CSI) for a small number of subbands. Method 500 may also be performed by system 200 of FIG. 2 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, a channel state information (CSI) reporting configuration message is received. For example, UE 105 receives the CSI reporting configuration message from a base station.

At 504, UE 105 can determine, using the received CSI reporting configuration message, a parameter. Using the determined parameter and a threshold, UE 105 can determine whether or not to generate and transmit a CSI report. In some examples, UE 105 generates and transmits the CSI report with some minimum configuration. In other words, before generating and/or sending the CSI report, UE 105 can determine whether a minimum configuration is met. If the minimum configuration is met, then UE 105 can generate and send the CSI report. However, if the minimum configuration is not met, UE 105 does not generate and transmit the CSI report.

At 506, the determined parameter is compared with a threshold. If the parameter is greater or equal to the threshold, UE 105 generate the CSI report in 508. In some examples, the CSI report is generated for release 16 (Rel-16) Type II codebook. However, if the parameter is less than the threshold, UE 105 does not generate the CSI report.

At 510, UE 105 can transmit the CSI report to base station 101, where base station 101 can adapt its data transmission(s) to UE 105 based on the CSI report.

According to some aspects, the parameter can include a maximum number of non-zero coefficient. In other words, the minimum configuration can include minimum resulting number of non-zero coefficient as indicated by parameter $k_0$ discussed above. In this example, the threshold can have a value of 2 if a rank indicator (RI) has a value of 1 or 2, can have a value of 3 if the RI has a value of 3, or can have a value of 4 if the RI has a value of 4.

According to some aspects, the CSI reporting configuration message can include reporting band information and the parameter is a number of CSI subbands determined from the reporting band information. For example, the reporting band information includes a bitmap and the number of CSI subbands is determined based on a number of bits having a value of 1 in the bitmap.

According to some aspects, the threshold includes a minimum number of CSI subbands. In other words, the minimum configuration can include minimum number of CSI subbands $N_{SB}$ based on the parameter configurations. In this example, the threshold can have a value of 5 if a rank indicator (RI) has a value of 1 or 2, can have a value of 9 if the RI has a value of 3, or can have a value of 13 if the RI has a value of 4. Additionally, or alternatively, the threshold can have a value of 5 if a rank indicator (RI) has a value of 3 or 4.

According to some aspects, UE 105 can transmit, to base station 101, a message including the threshold used by UE 105 to determine whether to generate the CSI report. For example, during the exemplary initial communication discussed above (or any other initial access), UE 105 can communicate the minimum configuration (for example, the threshold used to determine whether to generate the CSI report) to base station 101.

Figure 6:
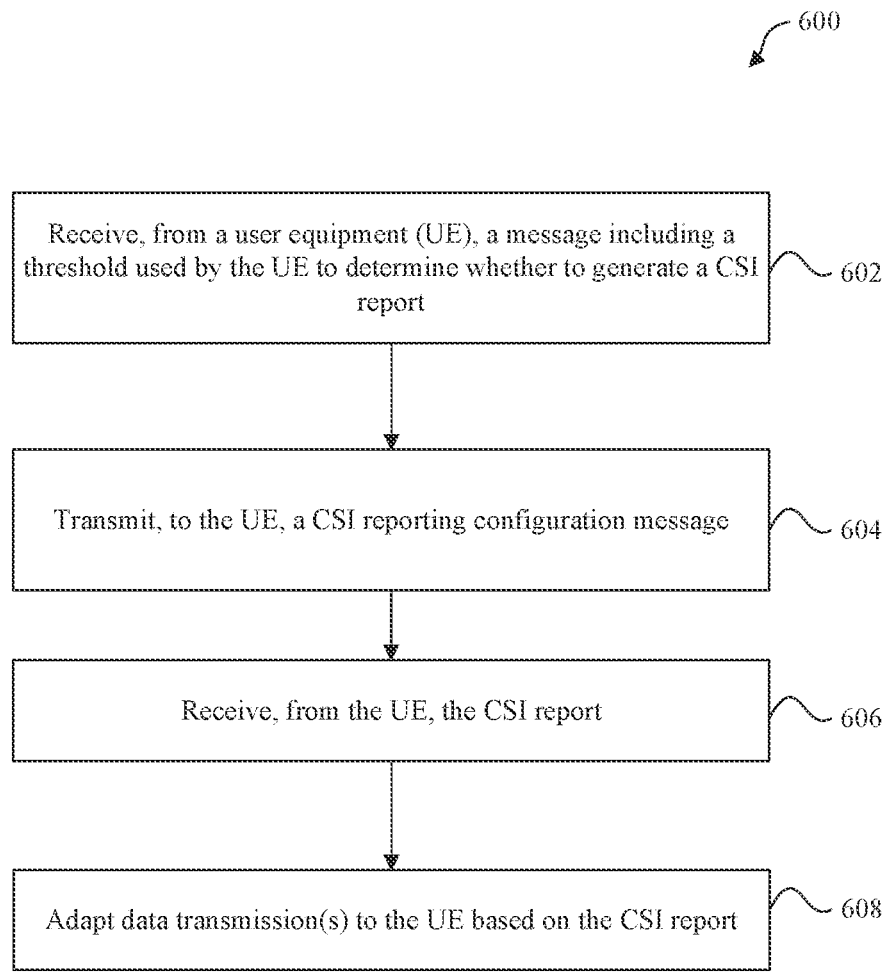
FIG. 6 illustrates an example method for a system (for example a base station) supporting mechanisms for implementing multi-input multi-output (MIMO) channel state information (CSI) for a small number of subbands, according to some aspects of the disclosure.

FIG. 6 illustrates an example method 600 for a system (for example a base station) supporting mechanisms for implementing multi-input multi-output (MIMO) channel state information (CSI) for a small number of subbands, according to some aspects of the disclosure. As a convenience and not a limitation, FIG. 6 may be described with regard to elements of FIGS. 1, 2, and 7. Method 600 may represent the operation of an electronic device (for example, base station 101 of FIG. 1) implementing mechanisms for implementing multi-input multi-output (MIMO) channel state information (CSI) for a small number of subbands. Method 600 may also be performed by system 200 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

At 602, a message is received, at, for example, base station 101 and from UE 105, including a threshold used by the UE to determine whether to generate a CSI report. For example, during the exemplary initial communication discussed above (or any other initial access), base station 101 receives, from UE 105, the minimum configuration (for example, the threshold) used by UE 105 to determine whether to generate the CSI report.

At 604, a CSI reporting configuration message is transmitted to UE 105. The CSI reporting configuration message can include information used by UE 105 to determine one or more parameters used to determine whether to generate the CSI report. For example, the CSI reporting configuration message can include reporting band information used by UE 105 to determine the one or more parameters. For example, the reporting band information includes a bitmap. According to some aspects, base station 101 generates the CSI reporting configuration message based, at least in part, on capabilities of UE 105 that are reported in the message received in 602.

At 606, base station 101 can receive, from UE 105, a CSI report generated by UE 105. The CSI report include information associated with, for example, the downlink communication link(s) between base station 101 and UE 105. At 608, base station 101 can adapt its data transmission(s) to UE 105 based on the received CSI report.

Figure 7:
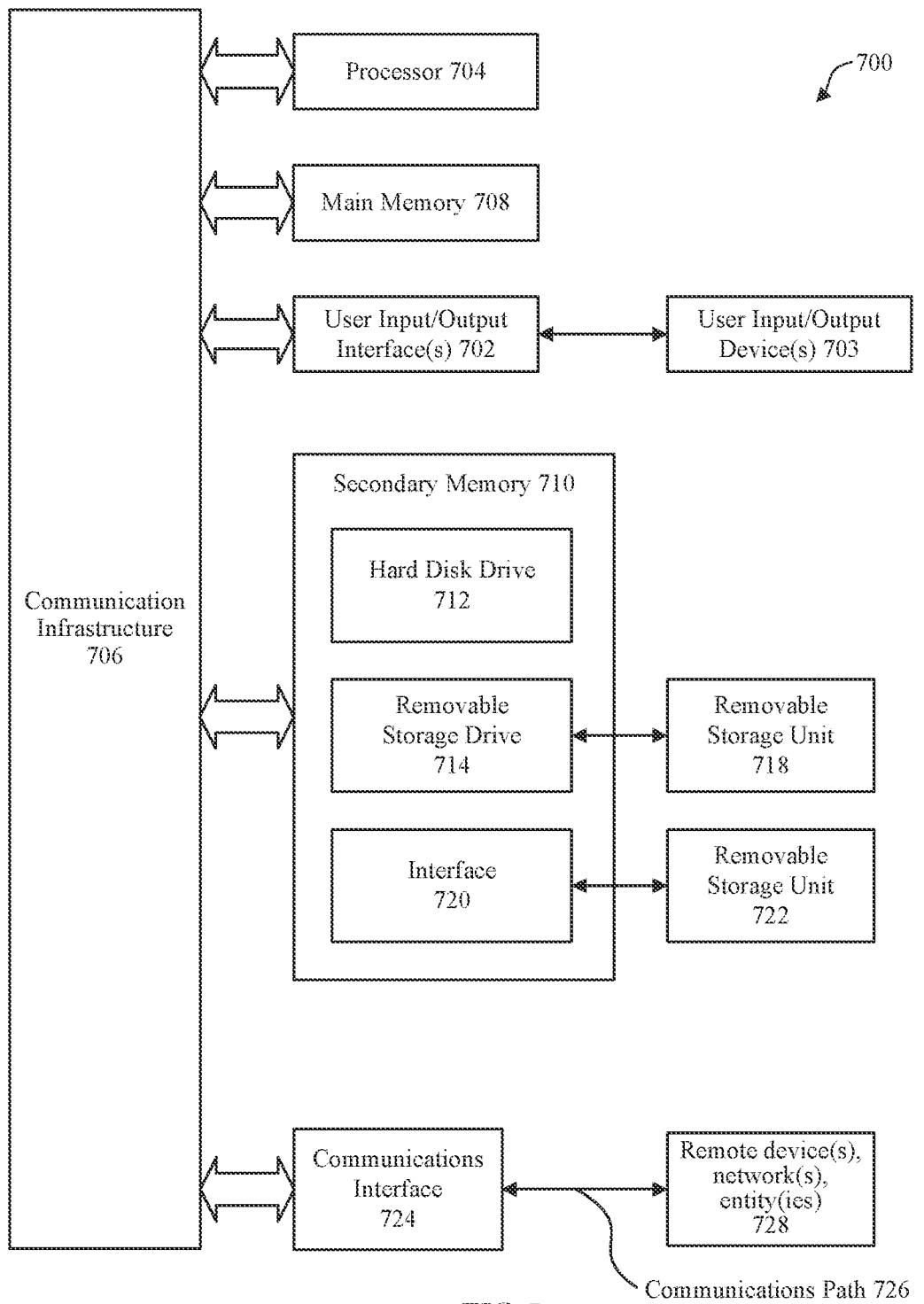
FIG. 7 is an example computer system for implementing some aspects or portion(s) thereof.

Various aspects can be implemented, for example, using one or more computer systems, such as computer system 700 shown in FIG. 7. Computer system 700 can be any well-known computer capable of performing the functions described herein such as devices 101, 105 of FIG. 1, or 200 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
a transceiver configured to communicate with a base station; and
a processor communicatively coupled to the transceiver and configured to:
receive, using the transceiver and from the base station, a channel state information (CSI) reporting configuration message;

determine, using the CSI reporting configuration message, that a number of physical resource blocks (PRBs) of a bandwidth part (BWP) associated with the CSI reporting configuration message is less than a threshold number;

generate a CSI report for the BWP for only a release 15 (Rel-15) Type I CSI without reporting for a Rel-15 Type II CSI and without reporting for a Rel-16 Type CSI; and transmit, using the transceiver, the CSI report to the base station.

2. The UE of claim 1, wherein the processor is further configured to transmit, using the transceiver and to the base station, a message indicating that the UE is configured to generate the CSI report for the BWP and wherein the message further indicates one or more codebook types for which the UE is configured to generate the CSI report for the BWP.

3. The UE of claim 1, wherein the CSI report comprises a wideband channel quality indicator (CQI) and a wideband precoding matrix indicator (PMI).

4. The UE of claim 1, wherein the CSI report is associated with one subband and the CSI report comprises a wideband channel quality indicator (CQI) and a wideband precoding matrix indicator (PMI).

5. The UE of claim 1, wherein a size of one subband is equal to a size of the BWP.

6. The UE of claim 1, wherein the CSI report is associated with one subband for a precoding matrix indicator (PMI).

7. The UE of claim 1, wherein the CSI report is associated with two subbands for a precoding matrix indicator (PMI).

8. The UE of claim 7, wherein:
in response to the number of the PRBs of the BWP being even, a number of the PRBs of each of the two subbands is half of the number of the PRBs of the BWP; and
in response to the number of the PRBs of the BWP being odd, one of the two subbands has one PRB less than other one of the two subbands.

9. The UE of claim 1, wherein in response to a csi-ReportingBand of the CSI reporting configuration message not configured or having a bitmap with value of 0 for each bit of the bitmap, the processor is configured to determine that an error has occurred or is configured to generate the CSI report comprising a wideband channel quality indicator (CQI) and a wideband precoding matrix indicator (PMI).

10. The UE of claim 1, wherein the threshold number is 24 PRBs.

11. The UE of claim 1, wherein the Rel-15 Type I CSI comprises Rel-15 Type I Single Panel CSI codebook.

12. A user equipment (UE), comprising:
a transceiver configured to communicate with a base station; and
a processor communicatively coupled to the transceiver and configured to:
receive, using the transceiver and from the base station, a channel state information (CSI) reporting configuration message;
determine, using the CSI reporting configuration message, a parameter;
compare the parameter with a threshold, wherein the parameter comprises a maximum number of non-zero coefficient and the threshold
has a value of 2 in response to a rank indicator (RI) having a value of 1 or 2,
has a value of 3 in response to the RI having a value of 3, and
has a value of 4 in response to the RI having a value of 4;
generate a CSI report in response to the parameter being greater than or equal to the threshold; and
transmit, using the transceiver, the CSI report to the base station.

13. The UE of claim 12, wherein the CSI reporting configuration message comprises reporting band information and the parameter comprises a number of CSI subbands determined from the reporting band information.

14. The UE of claim 13, wherein the reporting band information comprises a bitmap and the processor is configured to determine the number of CSI subbands based on a number of bits having a value of 1 in the bitmap.

15. The UE of claim 12, wherein the processor is configured to generate the CSI report for release 16 (Rel-16) Type II codebook.

16. The UE of claim 12, wherein the processor is configured to transmit, using the transceiver and to the base station, a message including the threshold used by the UE to determine whether to generate the CSI report.

17. A method, comprising:
receiving, by a user equipment (UE) and from a base station, a channel state information (CSI) reporting configuration message;
determining, using the CSI reporting configuration message, that a number of physical resource blocks (PRBs) of a bandwidth part (BWP) associated with the CSI reporting configuration message is less than a threshold number;
generating a CSI report for the BWP for only a release 15 (Rel-15) Type I CSI without reporting for a Rel-15 Type II CSI and without reporting for a Rel-16 Type CSI; and
transmitting the CSI report to the base station.

18. The method of claim 17, wherein the Rel-15 Type I CSI comprises Rel-15 Type I Single Panel CSI codebook.

* * * * *

UNITED STATES PATENT AND TRADEMARK OFFICE
CERTIFICATE OF CORRECTION

PATENT NO. : 12,267,131 B2  
APPLICATION NO. : 17/439292  
DATED : April 1, 2025  
INVENTOR(S) : Sun et al.

Page 1 of 1

It is certified that error appears in the above-identified patent and that said Letters Patent is hereby corrected as shown below:

On the Title Page

Item (71) Applicants, Line 2, delete "Haitong Sun, Cupertino, CA (US)".

Signed and Sealed this  
Sixth Day of May, 2025

Coke Morgan Stewart  
*Acting Director of the United States Patent and Trademark Office*